(12) United States Patent
Hamilton et al.

(10) Patent No.: US 6,516,381 B1
(45) Date of Patent: Feb. 4, 2003

(54) SUPPLYING VOLTAGE TO A MEMORY MODULE

(75) Inventors: Tony Hamilton, Durham, NC (US); Marty Goodman, Hillsboro (DE); Roger Sakuma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/407,159

(22) Filed: Sep. 28, 1999

(51) Int. Cl.[7] ............................................... G06F 13/00
(52) U.S. Cl. ..................................................... 711/105
(58) Field of Search ........................... 711/105; 713/300

(56) References Cited

U.S. PATENT DOCUMENTS

| | | | | |
|---|---|---|---|---|
| 5,390,334 A | * | 2/1995 | Harrison .................... 395/750 |
| 5,650,771 A | * | 7/1997 | Lee ............................. 340/656 |
| 5,828,892 A | * | 10/1998 | Mizuta .................. 395/750.01 |
| 6,067,593 A | * | 5/2000 | Schade ........................ 710/126 |
| 6,269,028 B1 | * | 7/2001 | Hollmer et al. ........ 365/185.29 |

* cited by examiner

Primary Examiner—Kevin L. Ellis
(74) Attorney, Agent, or Firm—Fish & Richardson P.C.

(57) ABSTRACT

Included in the system are a memory module, a controller, and a voltage regulator. The memory module stores data indicating a level of voltage needed for operation. The controller obtains the data from the memory module and outputs a signal, based on the data, indicating the level of voltage needed by the memory module. The voltage regulator receives the signal from the controller, and supplies the level of voltage to the memory module in accordance with the signal.

36 Claims, 4 Drawing Sheets

SUPPLYING VOLTAGE TO A MEMORY MODULE

BACKGROUND OF THE INVENTION

This invention relates to supplying voltage to a memory module.

Memory modules, such as a small outline dual in-line memory module ("SO-DIMM"), currently use a common collector voltage ("VCC") of 3.3 volts ("V"). Their components, however, can sometimes operate at lower voltages. For example, some synchronous dynamic random access memories ("SDRAM") used in SO-DIMMs can operate at 2.5 V with little or no performance degradation.

SUMMARY OF THE INVENTION

In general, in one aspect of the invention, data is obtained which indicates a level of voltage needed by a memory module for operation. The level of voltage is then supplied to the memory module.

Among the advantages of the invention may be one or more of the following. The memory module can be powered with less voltage (for example, 2.5 V) without substantially affecting its performance. The memory module is thus well suited for use in portable computers and other battery-powered devices. Another benefit is that the same memory module can be used with systems that have different voltage requirements. For example, the same memory module could be used with 2.5 V systems and with 3.3 V systems.

Other advantages and features will become apparent from the following description and the claims.

DESCRIPTION

Figure 1:
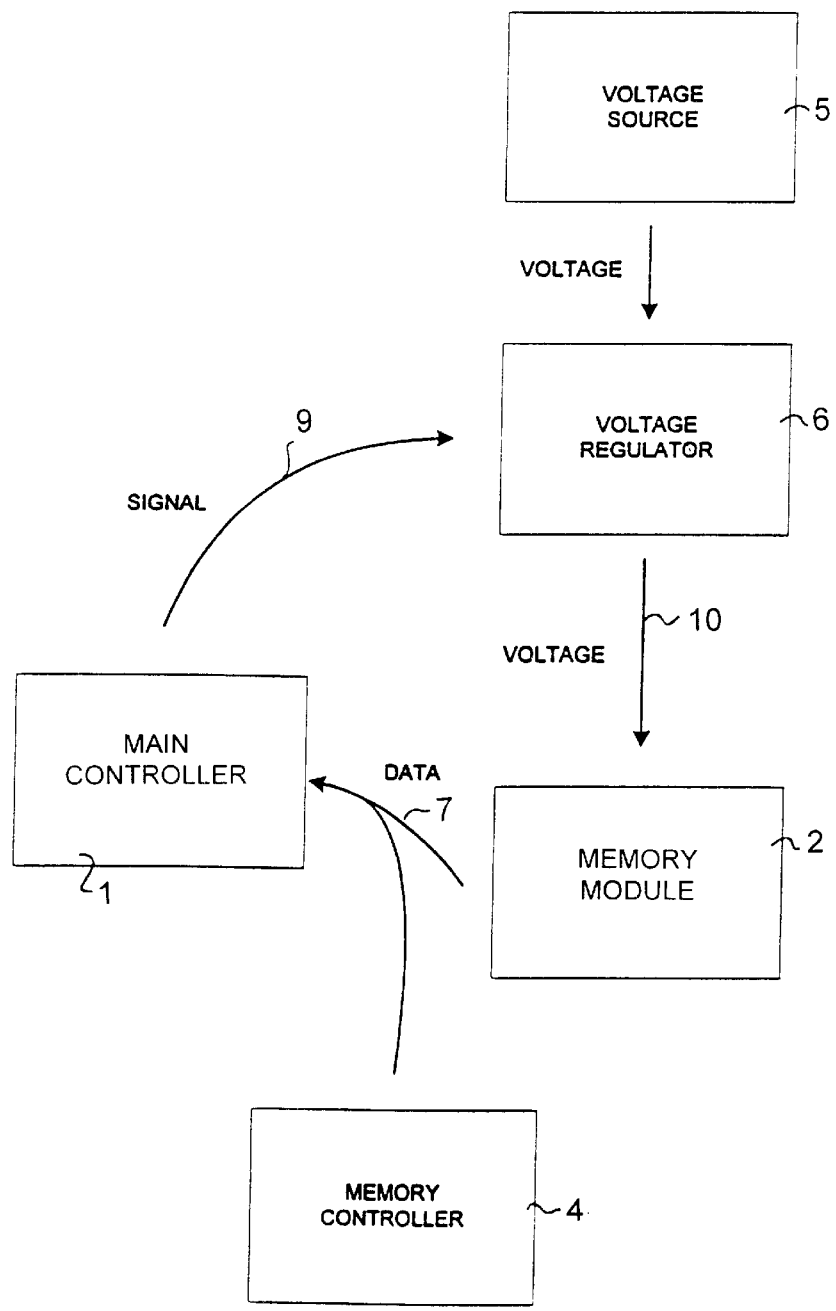
FIG. 1 is a functional block diagram of a memory module system according to one embodiment of the invention.

FIG. 1 shows a main controller 1, a memory module 2 (such as an SO-DIMM), a memory controller 4, a voltage source 5, and a voltage regulator 6. Memory module 2 stores data indicating a level of voltage that it needs for operation. Alternatively, this data may be stored in memory controller 4.

Main controller 1 obtains the data 7 from memory module 2 (or from memory controller 4), determines the level of voltage needed by memory module 2 based on the data, and outputs a signal 9 instructing voltage regulator 6 to output the appropriate level of voltage. Voltage regulator 6 receives this signal and, as instructed by main controller 1, supplies the appropriate level of voltage 10 from voltage source 5 to memory module 2. This process is described in more detail below in connection with FIGS. 2 and 3.

Figure 2:
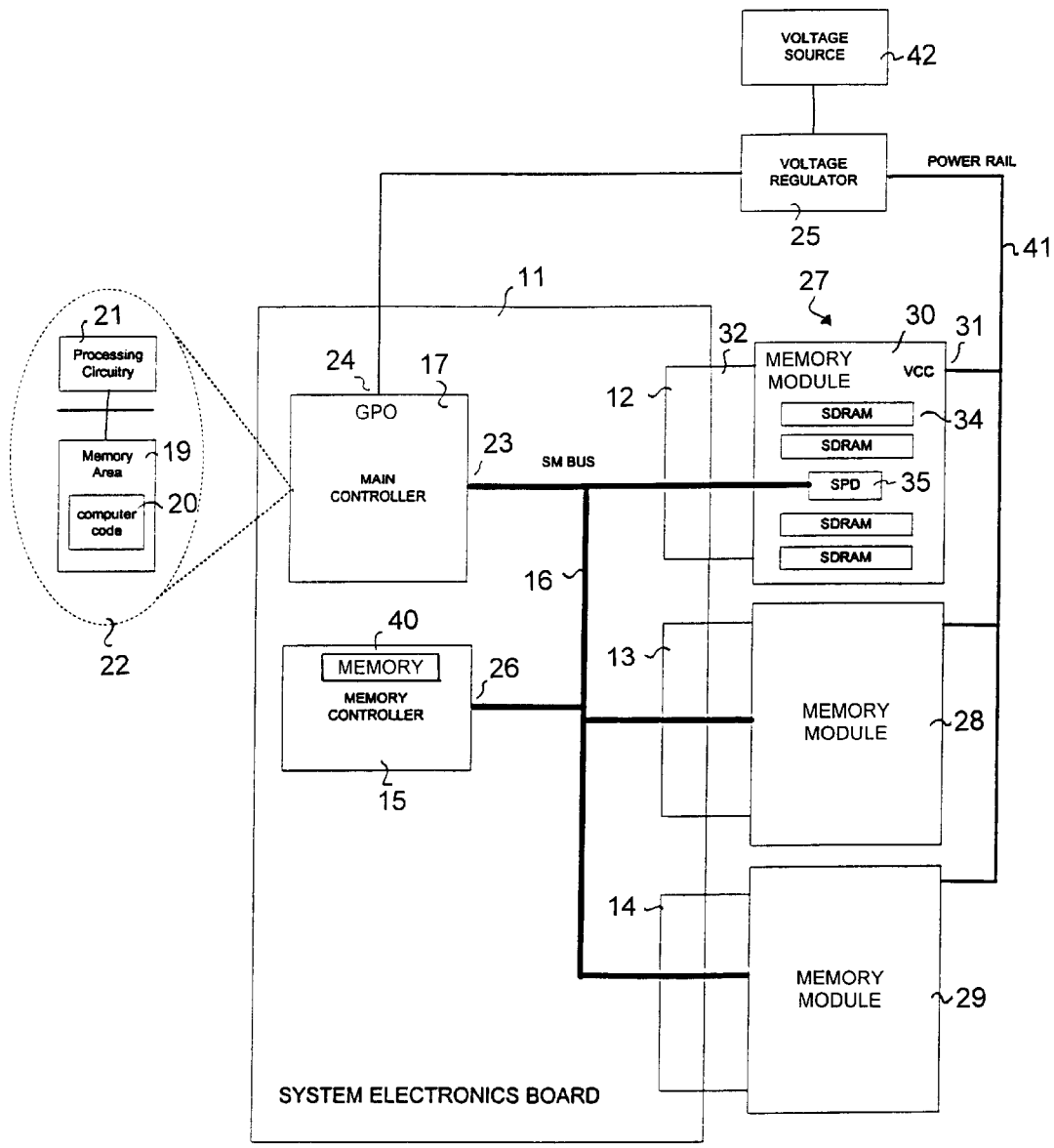
FIG. 2 is a diagram of a multiple memory module system according to one embodiment of the invention.

In FIG. 2, system electronics ("SE") board 11 is part of a computer such as a (portable) laptop or desktop, and includes sockets 12 to 14, memory controller 15, system management ("SM") bus 16, and main controller 17.

Main controller 17 is a microcontroller, such as an SMC (System Management Controller), or a PIIX (peripheral component interface {"PCI"} to industry standard interface {"ISA"} accelerator). Included in main controller 17 are a memory area 19 for storing computer code 20 and processing circuitry 21 for executing the computer code 20 (see view 22). Also included in main controller 17 are a general purpose output ("GPO") 24, over which signals are sent to voltage regulator 25, and an interface 23 to SM bus 16, over which data is exchanged with memory controller 15 and memory modules 27 to 29.

Memory modules 27 to 29 are substantially identical in structure; therefore, only memory module 27 is described in detail. Memory module 27 is comprised of a mounting board 30 which includes wires (not shown) that connect mounted components, a terminal 31 for receiving VCC from voltage regulator 25, a connector 32 which mates to socket 12 on SE board 11, and one or more SDRAMs 34 for storing data and/or computer code. On memory module 27, other memories may be used in place of, or in addition to, SDRAMs. For example, DRAMs or SRAMs (static random access memory) may be used. Memory module 27 may be an SO-DIMM, for example.

Memory module 27 also includes a reserved serial presence detect ("SPD") field 35. SPD field 35 stores data indicating the level of voltage needed by memory module 27 to operate ("voltage data"). The SPD field is a memory area that can be located in one of the SDRAMS or, alternatively, on a separate IC (integrated circuit) on memory module 27 (as shown).

The voltage data may take any form. For example, it may be numerical values indicating the required voltage level of memory module 27. Alternatively, the voltage data may indicate whether memory module 27 supports a reduced (low) power mode of operation and/or a standard (high) power mode of operation (memory modules that support reduced power operation are tolerant of standard power operation). Reduced power mode and standard power mode correspond to different amounts of voltage used by the memory module during its operation. Examples of reduced power mode and standard power mode voltages are 2.5 V and 3.3 V, respectively; however, any other "low" and "high" voltages may be used.

Figure 4:
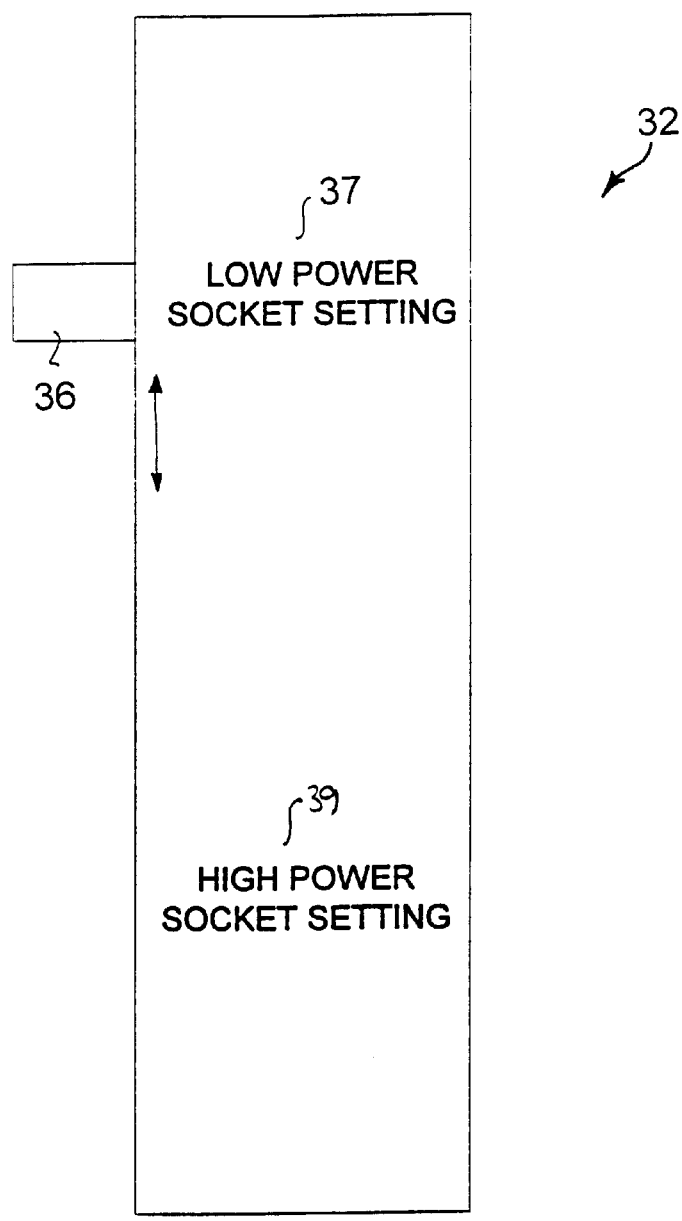
FIG. 4 shows a mechanically-configurable connector according to one embodiment of the invention.

Connector 32 includes a mechanical interface that is configurable to mate to a 2.5 V (or other reduced power) SE board socket and to a 3.3 V (or other standard power) SE board socket. Mechanical keying is used to configure connector 32. For example, as shown in FIG. 4, a moveable tab 36 can be set to a reduced power socket setting 37 or to a standard power socket setting 39. Additional tab settings may be provided to accommodate other power modes.

Instead of storing voltage data in SPD fields, voltage data for one or more of memory modules 27 to 29 may be stored in a memory 40 on memory controller 15 (FIG. 2), such as an electrically erasable programmable read-only memory ("EEPROM"). Memory controller 15 is a microcontroller or the like which controls configuration of, and access to, memory modules 27 to 29. Memory controller 15 communicates with memory modules 27 to 29 and with main controller 17 over SM bus 16. Thus, memory controller can obtain the voltage data from the memory modules themselves, or from an external source (not shown).

Voltage regulator 25 is comprised of power control circuitry that regulates an amount of voltage supplied to power rail 41 from voltage source 42. Voltage regulator 25 and voltage source 42 may be located on SE board 11 or elsewhere (as shown in FIG. 2) Each of memory modules 27 to 29 receives voltage from power rail 41; therefore, each is dependent upon voltage regulator 25. Voltage source 42 is a power source, such as a +5 V battery or the like.

Figure 3:
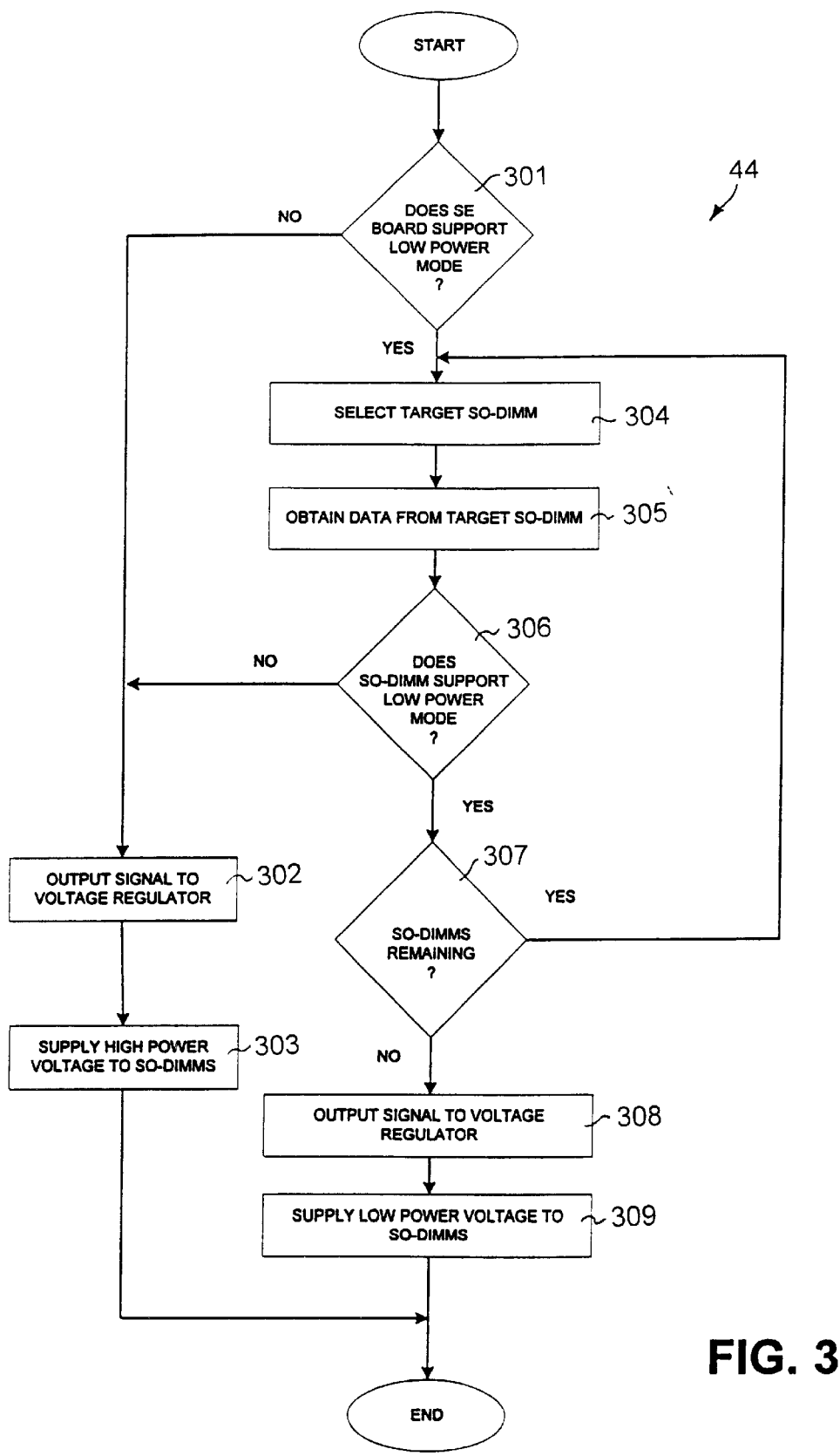
FIG. 3 shows a process for supplying voltage to memory modules according to one embodiment of the invention.

In FIG. 3, a process 44 for supplying voltage to memory modules 27 to 29 is performed (in part) by computer code 20 executing on main controller 17. The attached Appendix shows an example of pseudo-code which implements process 44.

In 301, main controller 17 determines whether SE board 11 supports operation in a reduced power (e.g., 2.5 V) mode. If not, main controller 17 outputs 302 a signal to voltage regulator 25 indicating that a standard power mode voltage (e.g., 3.3. V) is needed. Outputting the signal in 302 may not be necessary if voltage regulator 25 is already supplying the standard power mode voltage and main controller 17 knows this. In 303, voltage regulator 25 supplies the standard power mode voltage to memory modules 27 to 29 via power rail 41.

If SE board 11 does support the reduced power mode of operation in 301, main controller 17 selects 304 a target memory module 27. Memory modules may be selected in any order. Main controller 17 obtains 305 voltage data for target memory module 27 by reading it from SPD 35 or from memory 40 via SM bus 16. Main controller 17 then analyzes the read voltage data in order to determine 306 if target memory module 27 supports a reduced power mode of operation.

If target memory module 27 does not support the reduced power mode of operation, main controller 17 generates and outputs 302 a signal to voltage regulator 25 indicating that the standard power mode voltage level is needed by memory modules 27 to 29. Voltage regulator 25 supplies 303 the standard power mode voltage level to power rail 41. Since all three memory modules 27 to 29 receive voltage from power.rail 41, if only one of them requires the standard power mode voltage, all the memory modules will receive the standard power mode voltage.

If the target memory module does support the reduced power mode of operation in 306, main controller 17 determines 307 if there are any memory modules remaining that have not yet been selected. Here, the answer is yes; therefore, main controller 17 selects 304 a new target memory module 28. Main controller 17 repeats 305 to 307 for new target memory module 28. Assuming that target memory module 28 does support the reduced power mode of operation in 306, and since there is still one more memory module 29 remaining in 307, main controller 17 selects 304 the last remaining memory module 29.

Main controller 17 repeats 305 to 307 for target memory module 29. This time, however, main controller 17 determines in 307 that there are no memory modules remaining (since there are only three memory modules and all three have been selected). Accordingly, main controller 17 generates and outputs 308 a signal to voltage regulator 25 indicating that a reduced power mode voltage level is needed by memory modules 27 to 29. Voltage regulator 25 supplies 309 the reduced power mode voltage to power rail 41. Since all three memory modules 27 to 29 receive voltage from power rail 41, all three memory modules will receive this reduced power mode voltage.

In addition to outputting a signal to voltage regulator 25, main controller 17 may also advise (not shown) memory controller 15 that the reduced power mode is being used. In response, memory controller 15 may reconfigure itself to support the reduced power mode. For example, it may adjust the strengths of its internal buffers (not shown) in order to maintain signal quality. This, however, is not required.

Other embodiments are within the scope of the following claims. For example, more (or less) than three memory modules can be used. A separate power rail can be used for each memory module, thereby making it possible to provide each memory module with a different voltage level that comports with its stored voltage data. More than two power modes can be supported by the memory modules, in which case the process of FIG. 3 can be altered to accommodate the additional power modes. The invention can be used in any electronic device that requires memory, such as a personal digital assistant, and is not limited to traditional computers.

What is claimed is:

1. A method of supplying voltage to a memory module, comprising:

determining a voltage requirement of a system that includes the memory module;

obtaining data indicative of a reduced level of voltage needed by the memory module for operation; and supplying the reduced level of voltage to the memory module if the reduced level of voltage corresponds to the voltage requirement.

2. A method according to claim 1, wherein the obtaining comprises reading the data from the memory module.

3. A method according to claim 2, wherein the data is read from a reserved serial presence detect field.

4. A method according to claim 2, further comprising storing the data on the memory module.

5. A method according to claim 1, wherein the obtaining comprises reading the data from a memory controller used to configure the memory module.

6. A method according to claim 1, wherein the memory module comprises a small outline dual in-line memory module (SO-DIMM) that includes a synchronous dynamic random access memory (SDRAM).

7. An apparatus for supplying voltage to a memory module, comprising:

a memory which stores computer code; and a controller which executes the computer code (i) to determine a voltage requirement of a system that includes the memory module, (ii) to obtain data indicative of a reduced level of voltage needed by the memory module for operation, and (iii) to output a signal indicating the reduced level of voltage needed by the memory module if the reduced level of voltage corresponds to the voltage requirement.

8. An apparatus according to claim 7, wherein the controller obtains the data by reading the data from the memory module.

9. An apparatus according to claim 8, wherein the data is read from a reserved serial presence detect field.

10. An apparatus according to claim 7, wherein the controller obtains the data by reading the data from a memory controller used to configure the memory module.

11. An apparatus according to claim 7, wherein the reduced level of voltage is 2.5 V.

12. An apparatus according to claim 7, wherein the memory module comprises a small outline dual in-line memory module (SO-DIMM) that includes a synchronous dynamic random access memory (SDRAM).

13. An apparatus according to claim 7, which comprises a peripheral component interconnect (PCI) to industry standard architecture (ISA) accelerator.

14. An article comprising a computer-readable medium which stores instructions to:

determine a voltage requirement of a system that includes the memory module;

obtain data indicative of a reduced level of voltage needed by a memory module for operation; and output a signal indicating the reduced level of voltage needed by the memory module if the reduced level of voltage corresponds to the voltage requirement.

15. An article according to claim 14, wherein the obtaining instructions read the data from the memory module.

16. An article according to claim 15, wherein the data is read from a reserved serial presence detect field.

17. An article according to claim 14, wherein the obtaining instructions obtain the data by reading the data from a memory controller used to configure the memory module.

18. An article according to claim 14, wherein the reduced level of voltage is 2.5 V.

19. An article according to claim 14, wherein the memory module comprises a small outline dual in-line memory module (SO-DIMM) that includes a synchronous dynamic random access memory (SDRAM).

20. A memory module for use in a system having a voltage requirement, the memory module comprising:
    a memory area which stores data indicative of a reduced level of voltage needed by the memory module for operation; and
    a terminal for receiving the reduced level of voltage from an external source if the reduced level of voltage corresponds to the voltage requirement.

21. A memory module according to claim 20, further comprising a mechanical interface that is configurable to mate to more than one type of socket.

22. A memory module according to claim 21, wherein the mechanical interface is configurable to mate to a 2.5 V socket and to a 3.3 V socket.

23. A system comprising:
    a system board having a voltage requirement;
    a memory module, interfaced to the system board, which stores data indicative of a reduced level of voltage needed for operation;
    a controller which obtains the data from the memory module, and which outputs a signal, based on the data, indicating the reduced level of voltage needed by the memory module if the reduced level of voltage corresponds to the voltage requirement of the system board; and
    a voltage regulator which receives the signal from the controller, and which supplies the reduced level of voltage to the memory module in accordance with the signal.

24. A portable electronic device which includes the system of claim 23.

25. A system comprising:
    a system board having a voltage requirement;
    a memory module interfaced to the system board;
    a memory controller which stores data indicative of a reduced level of voltage needed by the memory module;
    a controller which obtains the data from the memory controller, and which outputs a signal, based on the data, indicating the reduced level of voltage needed by the memory module if the reduced level of voltage corresponds to the voltage requirement of the system board; and
    a voltage regulator which receives the signal from the controller, and which supplies the reduced level of voltage to the memory module in accordance with the signal.

26. A portable electronic device which includes the system of claim 25.

27. A method of supplying voltage to memory modules, comprising:
    determining if a first memory module supports a low power mode of operation;
    determining if a second memory module supports the low power mode of operation; and
    supplying levels of voltage to the first and second memory modules that are based on whether the first and second memory modules support the low power mode of operation.

28. A method according to claim 27, wherein
    if both the first and second memory modules support the low power mode of operation, the supplying comprises supplying a voltage to the first and second memory modules consistent with the low power mode of operation; and
    if one or both of the first and second memory modules does not support the low power mode of operation, the supplying comprises supplying a voltage to the first and second memory modules consistent with a high power mode of operation.

29. A method according to claim 27, wherein the supplying comprises:
    supplying, to the first memory module, a level of voltage consistent with the low power mode of operation if the first memory module supports the low power mode of operation; and
    supplying, to the second memory module, a level of voltage consistent with the low power mode of operation if the second memory module supports the low power mode of operation.

30. A method according to claim 27, wherein:
    the determining relating to the first memory module is performed based on data indicating a level of voltage needed by the first memory module for operation; and
    the determining relating to the second memory module is performed based on data indicating a level of voltage needed by the second memory module for operation.

31. The method of claim 1, wherein if the reduced level of voltage does not correspond to the voltage requirement, the method further comprises:
    providing the voltage requirement of the system to the memory module.

32. The apparatus of claim 7, wherein if the reduced level of voltage does not correspond to the voltage requirement, the controller executes the computer code to output a signal instructing to provide the voltage requirement of the system to the memory module.

33. The article of claim 14, which stores instructions to output a signal instructing to provide the voltage requirement of the system to the memory module if the reduced level of voltage does not correspond to the voltage requirement.

34. The memory module of claim 20, wherein the terminal receives the voltage requirement of the system if the reduced level of voltage does not correspond to the voltage requirement.

35. The system of claim 23, wherein if the reduced level of voltage does not correspond to the voltage requirement:
    the controller outputs a second signal instructing the voltage regulator to provide the voltage requirement of the system to the memory module; and
    the voltage regulator receives the second signal from the controller and supplies the voltage requirement to the memory module in accordance with the signal.

36. The system of claim 25, wherein if the reduced level of voltage does not correspond to the voltage requirement:

the controller outputs a second signal instructing the voltage regulator to provide the voltage requirement of the system to the memory module; and the voltage regulator receives the second signal from the controller and supplies the voltage requirement to the memory module in accordance with the signal.

* * * * *